United States Patent [19]

Sindorf

[11] Patent Number: 5,173,377

[45] Date of Patent: Dec. 22, 1992

[54] APPARATUS FOR ELECTRICALLY CONNECTING CELL MODULES OF A METAL OXIDE-HYDROGEN BATTERY

[75] Inventor: John F. Sindorf, Pewaukee, Wis.

[73] Assignee: Globe-Union Inc., Milwaukee, Wis.

[21] Appl. No.: 783,006

[22] Filed: Oct. 28, 1991

[51] Int. Cl.$^5$ .......................................... H01M 12/08
[52] U.S. Cl. .................................. 429/101; 429/159; 429/185
[58] Field of Search ...................... 429/101, 27, 34, 35, 429/57, 26, 120, 181, 185, 206, 163, 159

[56] References Cited

U.S. PATENT DOCUMENTS

| | | |
|---|---|---|
| 3,669,744 | 6/1972 | Tsenter et al. |
| 4,189,527 | 1/1980 | Stadnick et al. ...................... 429/26 |
| 4,327,158 | 4/1982 | Holleck ................................ 429/101 |
| 4,477,540 | 10/1984 | Miller et al. ........................... 429/27 |
| 4,517,264 | 5/1985 | Miller et al. .......................... 429/163 |
| 4,683,178 | 7/1987 | Stadnick et al. ..................... 429/101 |
| 4,820,597 | 4/1989 | Lim et al. ............................. 429/50 |
| 4,923,769 | 5/1990 | Jones et al. .......................... 429/101 |
| 4,957,830 | 9/1990 | Jones .................................... 429/101 |

Primary Examiner—Anthony Skapars
Attorney, Agent, or Firm—Andrus, Sceales, Starke & Sawall

[57] ABSTRACT

An apparatus for electrically connecting cell modules of a metal oxide-hydrogen battery. The battery includes an outer pressure vessel containing a plurality of cell modules which are each sealed in a plastic bag and each cell module is provided with a vent which is permeable to the flow of gas but impermeable to the flow of liquid electrolyte. A pair of annular electrical conductors are associated with each cell module and extend through aligned holes in the bag. The conductors of each cell module are electrically insulated from each other and are disposed around an insulating tie rod. One of the conductors is connected to the positive terminals of the cell module, while the other of the conductors is connected to the negative terminals. A series of spring washers are mounted on the tie rod and urge the portions of each bag bordering the holes therein into tight sealing relation with the flange of the respective conductor to prevent leakage of the electrolyte through the holes in the bag.

15 Claims, 1 Drawing Sheet

APPARATUS FOR ELECTRICALLY CONNECTING CELL MODULES OF A METAL OXIDE-HYDROGEN BATTERY

BACKGROUND OF THE INVENTION

Metal oxide-hydrogen batteries, such as nickel oxide-hydrogen batteries, have seen use as aircraft starter batteries and in aerospace applications because they are rechargeable, have an extremely long cycle life and provide a uniform output throughout the entire discharge cycle.

In the typical nickel oxide-hydrogen battery, the battery cells are sealed in an outer pressure vessel that contains pressurized hydrogen gas. On discharge of the battery, the hydrogen gas diffuses through the electrolyte surrounding the catalyst surfaces of the negative plates and becomes disassociated to the mono-atomic form. The mono-atomic hydrogen is ionized and combines with hydroxyl ions to form water, with an electron being released in the process of forming each hydrogen ion. In addition, hydroxyl ions are formed at the positive electrode by the reaction of water with the available oxygen content of the nickel oxide. As a result of these reactions, an electron current is produced in the exterior circuit.

On recharging, the reaction is reversed, with the recharging being characterized by the regeneration of hydrogen at the negative electrode and the reoxidation of nickel at the positive electrode.

An aqueous solution of potassium hydroxide is commonly used as the electrolyte in a metal oxide-hydrogen battery. Because of the high wetability of potassium hydroxide, extreme care must be exercised to prevent capillary migration of the potassium hydroxide from the cell and possible bridging between cell modules which can cause a shorting path. To contain the electrolyte within the cell modules it has been proposed to seal each cell module in a flexible plastic bag which is impervious to the flow of the liquid electrolyte. The bag is provided with a vent which is permeable to gas flow but which is impermeable to the flow of the liquid electrolyte. With this construction, there has been need for a mechanism to electrically connect the positive and negative terminals of the cell modules without destroying the hermetically sealed characteristics of the bags.

SUMMARY OF THE INVENTION

The invention is directed to an apparatus for electrically connecting cell modules of a metal oxide-hydrogen battery which are contained in sealed electrically insulated closures, such as flexible plastic bags. The battery includes an outer pressure vessel containing a plurality of cell modules which are disposed in side-by-side stacked relation, each having at least one positive electrode and at least one negative electrode and containing a liquid electrolyte such as potassium hydroxide. Each cell module is enclosed in a flexible sealed bag, preferably formed of a thermoplastic film, which is impervious to the flow of liquid electrolyte.

To permit the flow of gas into and out of the bag, each bag is provided with a vent which is permeable to the flow of gas but impermeable to the flow of the liquid electrolyte.

A pair of annular electrical conductors are associated with each cell module and each conductor includes a cylindrical sleeve portion that extends through a hole in the bag or closure. The conductors of each cell module are electrically insulated from each other and one of the conductors is connected to the positive terminals of the cell module while the other conductor is connected to the negative terminals.

An insulating tie rod extends through the electrical conductors of the various cell modules and the positive conductor of each cell module is in abutting electrical contact with the negative conductor of the adjacent cell module.

To provide a seal between the bag and the flange of the respective conductor, a series of resilient members, such as Bellville washers are disposed around the sleeve portions of the conductors and when the assembly is compressed axially on the tie rod, the force of the Bellville washers will urge the portion of each bag surrounding the hole therein into tight sealing relation with the flange of the respective conductor.

The Bellville washers, when compressed, create an annular area of contact around the tie rod between the bag and the conductor to thereby seal the holes in the bag and prevent possible migration of the electrolyte from the sealed bag. Migration of the electrolyte can cause drying out of the cell or cause shunt currents between the cell modules and possible premature failure of the battery.

Other objects and advantages will appear during the course of the following description.

DESCRIPTION OF THE DRAWINGS

The drawings illustrate the best mode presently contemplated of carrying out the invention.

In the drawings

DESCRIPTION OF THE ILLUSTRATED EMBODIMENT

Figure 1:
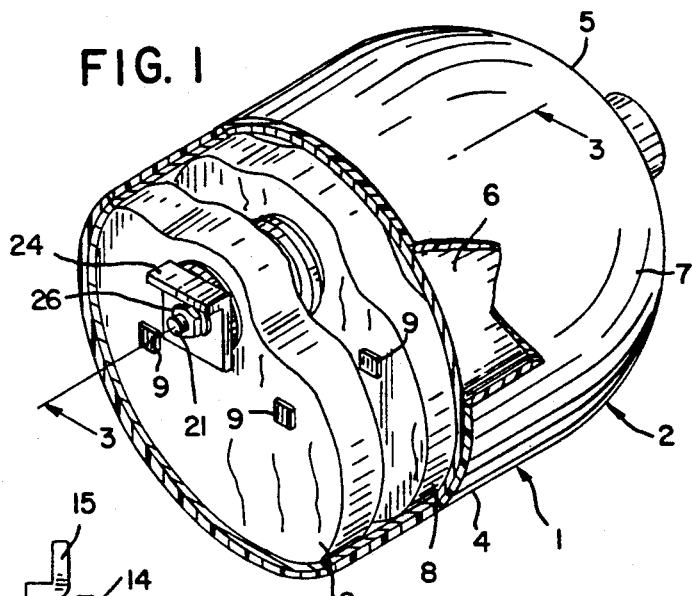
FIG. 1 is a perspective view with parts broken away of a metal oxide hydrogen battery incorporating the apparatus of the invention.

FIG. 1 illustrates a rechargeable, metal oxide-hydrogen battery, such as a nickel oxide-hydrogen battery. The battery 1 is composed of an outer pressure vessel 2 that houses a group of cell modules 3 which are disposed in side-by-side stacked relation. While the cell modules 3 are shown to be generally cylindrical in configuration, it is contemplated that the cell modules could also be rectangular or semi-cylindrical in shape.

Pressure vessel 2 includes a generally cylindrical shell 4, the open ends of which are enclosed by dome-shaped heads 5. The shell 4 and heads 5 can be composed of an inner metal liner 6 formed of a high strength corrosion resistant metal, such as Inconel or stainless steel, and an outer layer 7 of fibrous material impregnated with a thermosetting resin can be wound around the liner 6 by conventional filament winding techniques.

Each cell module 3 is of contentional construction and can be composed of a pair of back-to-back positive electrodes which are spaced apart by an electrode absorber layer, along with a pair of negative electrodes. The negative electrodes are separated from the adjacent positive electrodes by separator layers. In addition a gas diffuser screen can be located on the outer surface of each negative electrode.

The positive electrodes can be in the form of flat or sintered metal plaques impregnated with nickel hydroxide, while the negative electrodes can be in the form of fine mesh metal screens having a catalyst, such as platinum black, bonded to one surface of the screen through a hydrophobic polymeric material. A liquid electrolyte, such as potassium hydroxide solution, is impregnated into the fiber separator layers that separate the electrodes. The specific construction of the cell modules is conventional and in itself forms no part of the present invention.

Each cell modules 3 is contained within a sealed, electrically insulating closure or container, such as a flexible bag 8, preferably formed of a thermoplastic resin. Bag 8 is impervious to the passage of the liquid electrolyte and thus prevents the electrolyte from one cell module from migrating to an adjacent cell module and thereby bridging the cells. Bag 8 is preferably a multilayer structure composed of a central layer of nylon film sandwiched between outer layers of polyethylene. The nylon film provides strength for the bag, while the polyethylene layers aid in heat sealing the bag to provide a sealed structure.

To permit the flow of gas between the cell modules and the interior of the pressure vessel 2, each bag 8 is provided with one or more vents 9. Vents 9 are permeable to the flow of gas but impermeable to the flow of the liquid electrolyte so that the electrolyte cannot pass through the vents to the exterior of the bag. Vents 9 can be formed of a material sold under the tradename Gortex which is composed of Teflon fibers (polytetrafluoroethylene).

In accordance with the invention, a pair of conductors 11 and 12 are associated with each cell module 3. Each conductor 11, 12 includes a cylindrical sleeve section 13 which extends through a hole in bag 8 and a flange 14 which extends radially from the sleeve 13 and is located within the bag. A comb 15 extends radially from flange 14 of each conductor 11 and is connected to tabs 3a that extend outwardly from the straight or chordwise edge of the positive electrodes of each cell module 3. Similarly, a comb 15 projects from flange 14 of each conductor 12 and is connected to tabs 3b that extend outwardly from the edge of negative electrodes of the cell modules.

Figure 3:
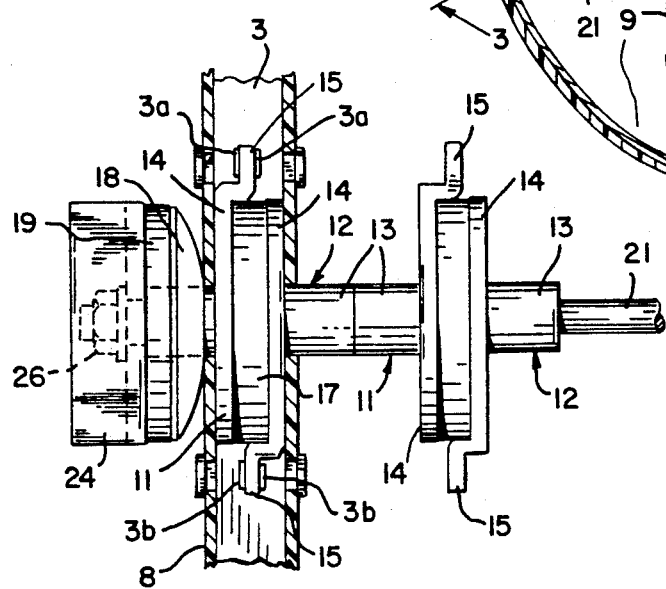
FIG. 3 is a fragmentary top plan view of the structure shown in FIG. 2.

As best shown in FIG. 3, the flanges 14 of the conductor 11, 12 of each cell module are insulated from each other by an inner washer 16 formed of an electrically insulating material, such as nylon, and an outer washer 17 which can be formed of a ceramic material. The ceramic washers 17 being rigid will prevent excessive compression of the nylon washers 16 when the entire mechanism is compressed axially, as will be hereinafter described.

Figure 2:
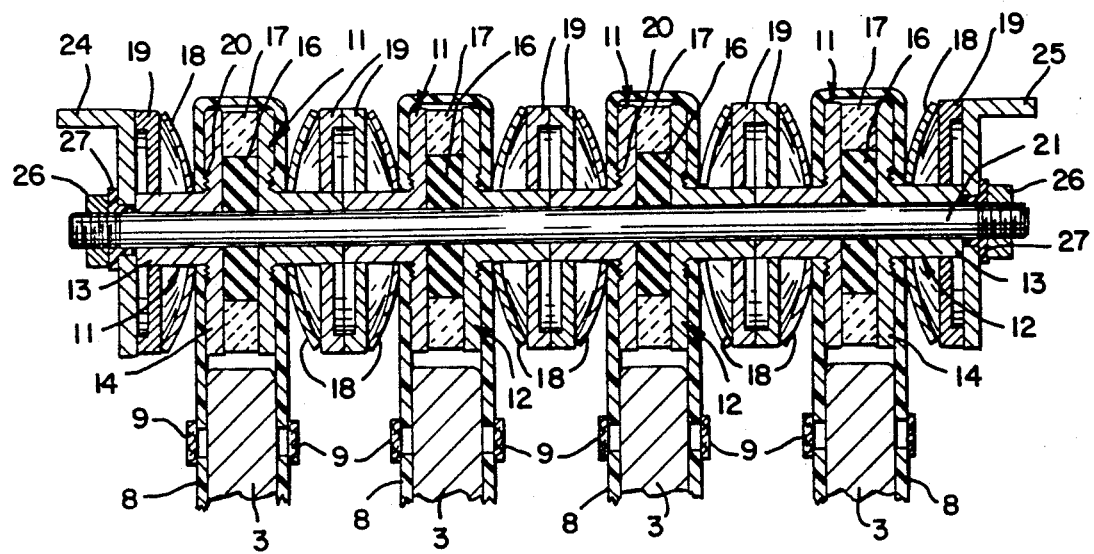
FIG. 2 is a longitudinal section taken through the battery and showing the apparatus for electrically connecting the cell modules.

A resilient member, such as a Bellville washer or spring 18, is disposed around the cylindrical sleeve section 13 of each of the conductors 11, 12. One end of each washer 18 bears against an annular metal seat 19, while the opposite end of each washer will force the portion of the bag 8 bordering the hole therein against the flange 14 of the respective conductor. As seen in FIG. 2, the outer surface of each flange 14 can be provided with surface deviations, such as serrations 20, which will tend to mechanically lock the bag 8 against the flange.

As best illustrated in FIG. 3, a tie rod 21 extends through the openings in the conductors 11 and 12. Tie rod 21 is preferably composed of a central metal core and has an insulating outer coating formed of a material such as Teflon. With the conductors 11, 12 assembled on the tie rod, the end of each positive conductor 11 will be in electrical contact with the abutting end of the next adjacent negative conductor 12.

Positive and negative terminal brackets 24 and 25 are mounted on the ends of the tie rod 21 and nuts 26 are threaded on the ends of the tie rod as shown in FIG. 3. An insulating washer 27 separates brackets 24, 25, tie rod 21 and nuts 26.

As nuts 26 are tightened down on tie rod 21, the Bellville washers 18 will be compressed to create an annular area of contact around each hole in the bag 8 to thereby tightly seal the bag to the flange 14 of the respective conductor 11 and 12. Through this sealing arrangement, migration of the electrolyte through the holes in the bag is eliminated, thus preventing the cell modules from drying out and also eliminating the possibility of shunt currents being developed which could cause premature failure of the battery.

Various modes of carrying out the invention are contemplated as being within the scope of the following claims particularly pointing out and distinctly claiming the subject matter which is regarded as the invention.

We claim:

1. A mechanism for electrically connecting cell modules of a metal oxide-hydrogen battery, said battery comprising an outer pressure vessel containing at least one cell module, said cell module having a positive terminal and a negative terminal and containing a liquid electrolyte, a sealed container composed of electrically insulating material enclosing said cell module and having a pair of aligned openings, gas vent means in the container, an insulating rod extending through said openings, a pair of annular electrical conductors associated with said cell module, said conductors disposed around said insulating rod and disposed in electrically insulated relation to each other, one of said conductors extending through one of said openings and connected to the positive terminal of the cell module and the other of said conductors extending through the other of said openings and connected to the negative terminal of the respective cell, and biasing means for urging the portions of said container bordering the openings therein into sealing relation with the respective conductor.

2. The mechanism of claim 1, wherein said biasing means comprises a plurality of springs, each spring urging said portions of the container into sealing engagement with the respective conductor.

3. The mechanism of claim 2, wherein each spring is annular in shape and is disposed around said rod.

4. The mechanism of claim 1, wherein each conductor includes a tubular section disposed around said rod and a flange portion disposed within the container and extending radially from said tubular portion, said flange portions being connected to the respective terminals of said cell module.

5. The mechanism of claim 3, and including a plurality of spring seats disposed around said rod, each spring being interposed between a seat and the portion of a bag bordering one of said openings.

6. The mechanism of claim 1, and including a pair of end members disposed on the respective ends of the rod, and means for moving the end members toward each other to compress said biasing means.

7. The mechanism of claim 6, wherein said means for moving the end members comprises a thread on at least one of the ends of said rod, and a nut engaged with said thread and disposed in bearing engagement with the respective end member.

8. The mechanism of claim 1, and including insulating spacing means disposed on said rod for separating the conductors.

9. A mechanism for connecting cell modules of a metal oxide-hydrogen battery, said battery including an outer pressure vessel and containing a plurality of cell modules, each cell module having a positive electrode and a negative electrode and containing a liquid electrolyte, a flexible sealed bag disposed around each cell module, gas vent means in each bag, each bag having a pair of aligned apertures, a pair of conductors associated with each cell module, connecting means for connecting the positive electrode to one of said conductors and for connecting the negative electrode to the other of said conductors, each conductor including a tubular section extending through an aperture of said bag and a radial section extending radially outward from the tubular section and disposed within the bag, insulating means for electrically insulating the radial section of one conductor of said pair from the radial section of the other conductor of said pair, the tubular section of each conductor being in electrical contact with a tubular section of a conductor of an adjacent pair, an insulating rod extending through the tubular sections of said conductors, and biasing means located outside of said bags for urging the portions of each bag bordering the respective apertures into sealing engagement with the respective radial sections of the conductors.

10. The mechanism of claim 9, wherein said biasing means comprises a plurality of Bellville springs, each spring disposed around a tubular section of a conductor and disposed in bearing engagement with said portion of a bag.

11. The mechanism of claim 10, and including a plurality of annular spring seats, each spring seat disposed around the rod, each spring being interposed between a seat and said portion of a bag.

12. The mechanism of claim 9, and including a pair of end members disposed on the ends of said rod, and means for moving the end members in a direction toward each other to compress said biasing means.

13. The mechanism of claim 9, and including a first tab projecting from each positive electrode and a second tab projecting from each negative electrode, said connecting means connecting said first and second tabs to the respective conductors.

14. The mechanism of claim 13, wherein each electrode has a straight chordwise edge, said tabs projecting from said chordwise edges.

15. The mechanism of claim 1, wherein said container is a flexible plastic bag.

* * * * *